US011938076B2

(12) United States Patent
Almodovar

(10) Patent No.: US 11,938,076 B2
(45) Date of Patent: Mar. 26, 2024

(54) ADJUSTABLE MASSAGE DEVICE FOR TRIGGER POINT RELEASE

(71) Applicant: Thomas Almodovar, Playa Del Rey, CA (US)

(72) Inventor: Thomas Almodovar, Playa Del Rey, CA (US)

(*) Notice: Subject to any disclaimer, the term of this patent is extended or adjusted under 35 U.S.C. 154(b) by 494 days.

(21) Appl. No.: 16/889,787

(22) Filed: Jun. 1, 2020

(65) Prior Publication Data

US 2021/0369549 A1 Dec. 2, 2021

(51) Int. Cl.

*A61H 15/00* (2006.01)
*A61H 7/00* (2006.01)
*A61H 39/04* (2006.01)

(52) U.S. Cl.

CPC ......... *A61H 15/0092* (2013.01); *A61H 7/003* (2013.01); *A61H 39/04* (2013.01); *A61H 2201/0192* (2013.01); *A61H 2201/1253* (2013.01); *A61H 2201/1685* (2013.01); *A61H 2203/0431* (2013.01); *A61H 2203/0437* (2013.01); *A61H 2203/0456* (2013.01); *A61H 2203/0468* (2013.01)

(58) Field of Classification Search

CPC .... A61H 15/0092; A61H 7/003; A61H 39/04; A61H 2201/0192; A61H 2201/1253; A61H 2201/1685; A61H 2203/0431; A61H 2203/0437; A61H 2203/0456; A61H 2203/0468; A61H 2201/0157; A61H 2201/0161; A61H 2201/1284; A61H 7/001; A61H 2015/0042; A61H 2201/169

See application file for complete search history.

(56) References Cited

U.S. PATENT DOCUMENTS 2,582,159 A * 1/1952 Race ........................ H01Q 1/24 343/823
4,037,839 A * 7/1977 Nelson .................. F41B 15/027 463/47.7
4,078,756 A * 3/1978 Cross ................. F16M 11/2078 248/512
4,210,135 A * 7/1980 Deuser ................... A61H 7/003 601/129
4,421,110 A * 12/1983 DeLisle ................. A61H 7/001 601/134

(Continued)

FOREIGN PATENT DOCUMENTS

DE 102015108058 A1 * 11/2016

*Primary Examiner* — Garrett K Atkinson
(74) *Attorney, Agent, or Firm* — Patential

(57) ABSTRACT

The present invention relates to therapeutic body massage devices, and more particularly, to an extendable and retractable massage device which is particularly effective in relieving tender and painful connective tissue and muscular conditions, including but not limited to trigger points. The present invention is directed to an appliance having an adjustable shaft that can access all points on both sides of the body and that allows an individual to place a pressure accessory element of the appliance between the body and a flat surface to apply sustained pressure to a treatment site with minimal effort without taxing other parts of the body and without the pressure accessory element dislodging from the treatment site. The present invention further provides a massage system and a method of self-administering massage therapy on a body or limb.

25 Claims, 14 Drawing Sheets

(56) References Cited

U.S. PATENT DOCUMENTS

| | | | | | |
|---|---|---|---|---|---|
| 4,490,063 | A | 12/1984 | Aho | | |
| 4,846,159 | A | 7/1989 | Anzal | | |
| 5,016,619 | A * | 5/1991 | Fitzpatrick | A46B 9/02 | 601/154 |
| 5,407,197 | A * | 4/1995 | Parsons | F41B 15/022 | 463/47.7 |
| 5,413,551 | A | 5/1995 | Wu | | |
| 5,509,653 | A * | 4/1996 | Parsons | F41B 15/022 | 463/47.7 |
| 5,540,017 | A | 7/1996 | Ouellette | | |
| 5,566,418 | A * | 10/1996 | Steffen | A47K 7/028 | D28/7 |
| 5,637,065 | A * | 6/1997 | Chang | A63B 23/14 | 601/72 |
| 5,839,967 | A * | 11/1998 | Moe | F41B 15/02 | 463/47.7 |
| 5,868,689 | A * | 2/1999 | Faroky | A61H 15/0092 | 601/131 |
| 6,306,040 | B1 * | 10/2001 | Chang | F41B 15/025 | 463/47.7 |
| 6,415,470 | B1 * | 7/2002 | Ramrattan | A45D 34/04 | 15/209.1 |
| 6,830,552 | B1 * | 12/2004 | Gonzalez | A61H 7/003 | D28/91.2 |
| 6,994,680 | B1 * | 2/2006 | Aponte | A61H 7/005 | 601/136 |
| 7,004,597 | B2 * | 2/2006 | Kukuk | F41H 9/10 | 362/110 |
| 7,169,120 | B2 | 1/2007 | Murdock et al. | | |
| 7,337,933 | B1 * | 3/2008 | Klinberg | A47G 25/82 | 223/118 |
| 7,399,285 | B2 * | 7/2008 | Stein | A61H 15/02 | 601/19 |
| 8,092,408 | B2 | 1/2012 | Sloan | | |
| 8,292,915 | B2 * | 10/2012 | Akcasu | A61H 15/0092 | 606/204 |
| 9,545,357 | B2 | 1/2017 | Pathrose | | |
| 9,833,049 | B1 * | 12/2017 | Winters | A45B 9/04 | |
| 10,322,059 | B2 * | 6/2019 | Tucker | A61H 23/00 | |
| 10,327,981 | B1 * | 6/2019 | Ayotte | A61H 1/008 | |
| 2002/0072692 | A1 * | 6/2002 | Batula | A47D 9/02 | 601/84 |
| 2002/0163799 | A1 * | 11/2002 | Kukuk | F21V 33/0064 | 362/102 |
| 2005/0015032 | A1 * | 1/2005 | Stein | A61H 15/02 | 601/134 |
| 2007/0203437 | A1 | 8/2007 | Squillace | | |
| 2008/0200851 | A1 * | 8/2008 | Faussett | A61H 15/0092 | 601/118 |
| 2009/0093743 | A1 * | 4/2009 | Corzine | A47K 7/028 | 601/134 |
| 2010/0094333 | A1 * | 4/2010 | Akcasu | A61H 39/04 | 606/204 |
| 2011/0224588 | A1 * | 9/2011 | Grippo | A61H 7/003 | 601/135 |
| 2012/0323151 | A1 * | 12/2012 | Faussett | A61H 15/0092 | 601/119 |
| 2013/0012851 | A1 * | 1/2013 | Fahmie | A61H 7/003 | 601/119 |
| 2014/0027596 | A1 * | 1/2014 | Chang | F16M 11/105 | 248/333 |
| 2014/0243116 | A1 * | 8/2014 | Durham | A63B 69/0075 | 473/417 |
| 2015/0202117 | A1 * | 7/2015 | Ishibashi | A61H 15/0092 | 601/119 |
| 2016/0136032 | A1 * | 5/2016 | Dakides | A61H 15/0092 | 601/84 |
| 2016/0262972 | A1 | 9/2016 | Phillips | | |
| 2018/0161234 | A1 * | 6/2018 | Dominee | A61H 15/00 | |
| 2019/0151189 | A1 * | 5/2019 | Morris | A61H 15/0092 | |

* cited by examiner

BALL LOCATIONS

BODY POSITION

BALL LOCATIONS

BODY POSITION

BALL LOCATIONS

BODY POSITION

BALL LOCATIONS

BALL LOCATIONS

BALL LOCATIONS

BODY POSITION

ADJUSTABLE MASSAGE DEVICE FOR TRIGGER POINT RELEASE

FIELD OF THE INVENTION

The present invention relates generally to therapeutic body massage devices, and more particularly to a self-administrable massage apparatus for the relief of tender and painful connective tissue and muscular conditions, including but not limited to trigger points. The length and positioning of the massage device are adjustable to meet the therapy needs of the individual.

BACKGROUND

Myofascial pain often results from muscle injury or repetitive strain. When stressed or injured, muscle tissue (myo) that is surrounded by connective tissue (fascia) can form trigger points, akin to contracted knots, which cause tightness, pain, and/or muscle weakness. Individuals can be predisposed to trigger point formation due to many factors, including poor posture, repetitive stress, inactivity, muscular de-conditioning, nutritional deficiencies, or mechanical imbalances, such as unequal leg length. Trigger points can be active or latent, with active trigger points typically causing an active episode of dull or sharp pain and latent trigger points causing discomfort when compressed.

Treatment of a trigger point involves unlocking the contraction mechanism of the muscle (sarcomere) that is locked into a shortened position. Trigger point pressure release typically requires applying pressure with a finger or other instrument to the trigger point and increasing the pressure as the trigger point "releases" and softens. The goal is to adjust the level of pressure applied at the appropriate juncture to cause the release without causing pain or further injury. The therapist providing treatment is typically applying a relatively high amount of pressure for a sustained period and relies on the patient to tell the practitioner if an unacceptable amount of pain is applied. However, the vocalization by the patient usually takes places after excessive pain has already been applied; thus, in some instances, treatment by a therapist can lead to an inadvertent application of excessive force which can lead to pain, discomfort, and even injury. To prevent such injury, many therapists will take a full medical and pain history and evaluate the patient's pain map for referred pain patterns prior to hands-on treatment.

Since the individual possesses first-hand knowledge about the level of pain experienced when a trigger point is touched on his or her body, it is advantageous and desirable for the individual to self-administer therapy and apply and then adjust the amount of pressure to facilitate the release or softening of a trigger point. The prior art teaches various self-administered massage devices, including many that utilize a ball or spherical object to be applied to a body site. A ball's rounded contours are well-suited to application on trigger points. However, because of this very shape, a ball tends to roll away from the target tissue site and is difficult to keep in place to apply sustained pressure to cause myofascial release. The prior art also teaches various massage sticks including percussive massage devices, spiked rollers, and other tools where the user strikes a muscle, rolls a body part such as the foot over the device, or otherwise exerts force against a target body site.

These massage products work superficially and are not particularly suited for intensive targeted massage required for trigger point release. A common shortcoming of these prior art devices is that attempting to apply therapy to one area of the body may result in an undesirable contraction or tension in another part of the user, such as in the hands, arms, and/or neck. Thus, the exertion of direct manual force in order to release the trigger point may cause tension and may prevent the user from relaxing the body or muscles to effectuate a release or softening of the trigger point. As evidenced by the occupational injuries that are common to massage therapists, achieving therapeutic effects through myofascial trigger point release or other massage therapy modalities requires strength and is generally taxing on the hands, arms, and on other parts of the body since trigger point release typically entails sustained application of a relatively high level of pressure. In order to achieve targeted and intensive massage for therapeutic effects, individuals have traditionally sought professional help from professional massage therapists, physical therapists, and other medical professionals. There is a continuing need for a self-administered massage tool that an individual can adjust, calibrate, and position accurately and precisely on trigger points that occur throughout the body, while at the same time, providing a sustained level of deep pressure required to release and soften the points.

SUMMARY OF THE INVENTION

The present invention solves the long-standing needs of providing a self-administrable massage tool that provides user-adjustable targeted therapy in a precise and accurate manner to release trigger points throughout the body. The present invention includes an adjustable shaft that can access all points on both sides of the body and that allows an individual to place a pressure accessory element of the massage tool between the body and a flat surface. It provides a tool for leveraging the weight of the body to apply sustained pressure to a treatment site with minimal effort without taxing other parts of the body and without the pressure accessory element dislodging from the treatment site.

In one aspect, the present invention provides an adjustable massage appliance that includes an extendable and retractable shaft made of two or more concentric tubular segments. The shaft has a proximal shaft end and a distal shaft end opposite the proximal shaft end, a handle connected to the proximal shaft end and a pressure accessory connected to the distal shaft end. In certain embodiments, the pressure accessory is a ball having a diameter in the range of 60 mm to 80 mm. In other embodiments, the ball has an average Shore durometer in the range from 30 to 90.

In a second aspect, the present invention is directed to a massage system comprising an adjustable massage appliance having the features discussed above, a handle connected to the proximal shaft end, and a pressure accessory connected to the distal shaft end. The distal shaft end comprises distal end threading configured to engage a pressure accessory threading connected to the pressure accessory. Further, the massage system comprises a pressure accessory that is replaceably detachable from the proximal shaft end and the pressure accessory is replaceably attachable to the handle. An end of the handle comprises threading is configured to engage the pressure accessory threading connected to the pressure accessory.

In a third aspect, the present invention is directed to a method of self-administering massage therapy on a body or limb. The method includes providing an extendable massage appliance made of an extendable and retractable shaft having a proximal shaft end and a distal shaft end opposite the proximal shaft end. A handle is connected to the proximal shaft end, and a ball is connected to the distal shaft end. The extendable and retractable shaft is extended to a desired length and the ball is positioned proximate to a muscle targeted for massage therapy while holding the handle. The weight of the user's body or limb is applied to press the targeted muscle against a surface of the ball. In an embodiment, the weight of the body or limb is shifted into the targeted muscle by incremental movement of the body or limb against the ball to vary an amount of pressured placed on the targeted muscle by the ball. The length of the extendable and retractable shaft may be adjusted to a second desired length and the ball is positioned proximate to a second muscle targeted for therapy while holding the handle. The second muscle is pressed towards the ball and the surface, thereby applying pressure to the ball.

DETAILED DESCRIPTION

As detailed below, the present invention provides an adjustable, self-administered massage device, a massage system, and a method of administering massage therapy whereby the user may control the location and amount of pressure on a muscle and is able to massage the muscle more thoroughly than a massage therapist would be able to work. The duration of use is also determined by the user. The tool can be used on a general area or for a specific trigger point. As used herein, trigger points are involuntary tight tender spots in a contracted muscle that may result in pain and/or dysfunction within the muscle. These tender spots or knots may develop when a muscle is overused or injured a contraction develops and knots occur. These knots develop when individual muscle fibers are over-stimulated and unable to release their contracted state.

Figure 1:
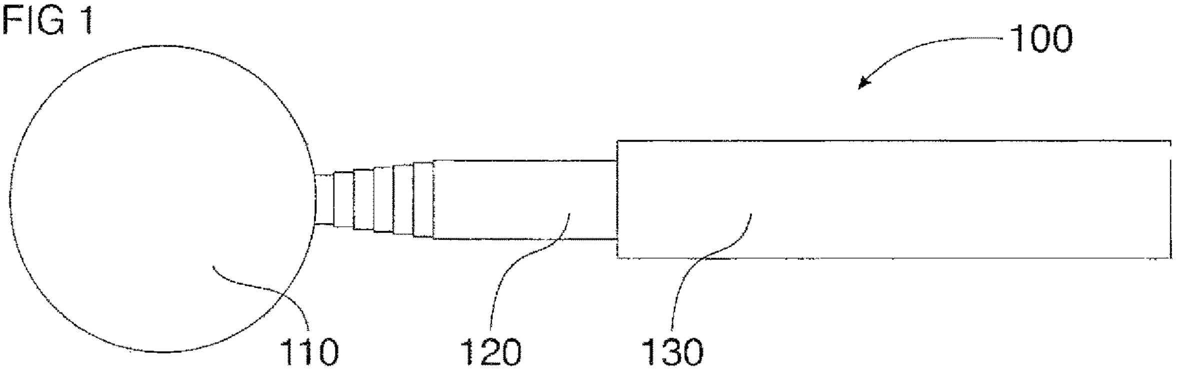
FIG. 1 is a schematic drawing of a side view of a massage tool of the present invention showing a ball portion and a handle portion on either side of an extendable shaft portion, which is in an unextended or retracted position.

Referring now to the figures, an exemplary embodiment of an adjustable massage appliance of the present invention is shown in FIG. 1. As shown in FIG. 1, the massage tool includes a shaft with a proximal end and a distal end. A handle is connected to the proximal shaft end and a pressure accessory comprising a ball is connected to the distal shaft end. The handle is affixed to the proximal end of the shaft. The handle is comprised of a solid or composite construction comprising foam, rubber, silicon, plastic, wood, elastomers or polymers or any proper handle material, which allows the user to hold on to the tool. It may have contours on its surface to provide gripping or additional friction. The length of the handle may be between 4 to 8 inches and have a diameter between three quarters of an inch to 1.5 inches.

The appliance comprises an extendable and retractable shaft having a proximal shaft end and a distal shaft end opposite the proximal shaft end. In certain embodiments, the shaft comprises two or more concentric tubular segments. The extendable shaft allows the user to place the ball in the exact position desired positioning without rolling away as other ball therapy balls do. Once the ball is placed under the body, it remains in place until the user moves it to another spot. In contrast, prior art massage balls are not fixed so when the ball is under the body and can move unexpectedly during use. Typical massage balls are difficult to place under the body in the exact spot needed because a person cannot reach all the areas of the body for placement. In contrast, the handle and shaft of the present invention allow for easy placement of the ball against the user while they are on the floor or against a wall. In certain embodiments, once the ball or other pressure accessory is placed in the desired position, the handle may be released and the hand and arm placed in a position alongside the body so that exertion by the arm or hand can be minimized and facilitate relaxation without manual application of direct pressure.

FIG. 1 shows a shaft having seven concentric tubular segments having differing diameters such that the shaft has a tapered side view profile from a proximal end to the distal end of the shaft. In other embodiments, the shaft may comprise as few as concentric tubular segments or as many as twelve. The user may easily extend one or more of the concentric tubular segments by holding the handle in one hand and with the other hand, pulling the ball or pressure accessory on the distal end of the device. The user may easily make the length of the shaft shorter by holding the handle in one hand and pushing the ball or pressure accessory longitudinally towards the handle. This may be done while the user is sitting, standing, or lying down, allowing for instant adjustment to reach all places on the surface of the body of the user with minimal reach effort by the user.

The extendable and retractable shaft is configured to extend, in certain embodiments, to a length of 4 feet, which accommodates adults up to 7 feet tall and allows reach of target muscle groups all over the body while holding the handle of the device of the present invention. The fully extended device can range from 3.5 feet to 4.5 feet. When retracted, the device is 10 to 14 inches in length and in some embodiments, 1 foot in length, making the device compact and portable. The tubular segments independently have a wall thickness in the range from 0.02 inches to 0.2 inches and in some embodiments 0.08 to 0.15 inches and in certain other embodiments, 0.1 inches. The shaft may be constructed of pure metal such as copper or aluminum, metal alloys such as stainless steel, chromium molybdenum alloys, or carbon fiber, plastic polymers such as ABS plastic, reinforced polymers including fiber reinforced plastics, composite materials, or other materials providing mechanical strength characteristics such as tensile strength, ductility, flexural strength or toughness to resist breakage or bending a fabricated as the tubular concentric segments that comprise the shaft of the present invention. In certain embodiments, the tubular segments of the retractable shaft are made of stainless steel. To facilitate mating with other elements of the appliance, as discussed in detail below, the distal shaft end comprises a distal end threading such as screw threads configured to engage with and mate with pressure accessory threading connected to the pressure accessory.

Without wishing to be bound by theory, the shaft of the device of the present invention, to which a ball is attached on one end and a handle on the other end, provides the mechanical advantage of levers. In general, a lever is a simple machine. The lever pivots on a fulcrum and produces an output (lifts a load) by exerting an output force on the load. Just as bones act as lever arms, joints act as pivots, and muscles provide the effort forces to move loads, the shaft of the devices of the present invention provides sturdy, length-adjustable support as the plank that provides the leverage required to make a big physical impact on a targeted muscle with minimal effort on the part of the user. In addition, once in place, this lever also prevents the ball from rolling away from the targeted area until the user decides to do so with minimal effort. By shifting or sliding the shaft using the handle, the user can position the ball to a new muscle site. This is also true when the ball is pressed between the body and a vertical surface such as a wall. By positioning and repositioning the ball incrementally on a series or cluster or trigger points, the user can treat an entire anatomical area, such as the upper back, which can consist of multiple trigger points needing release.

Figure 2:
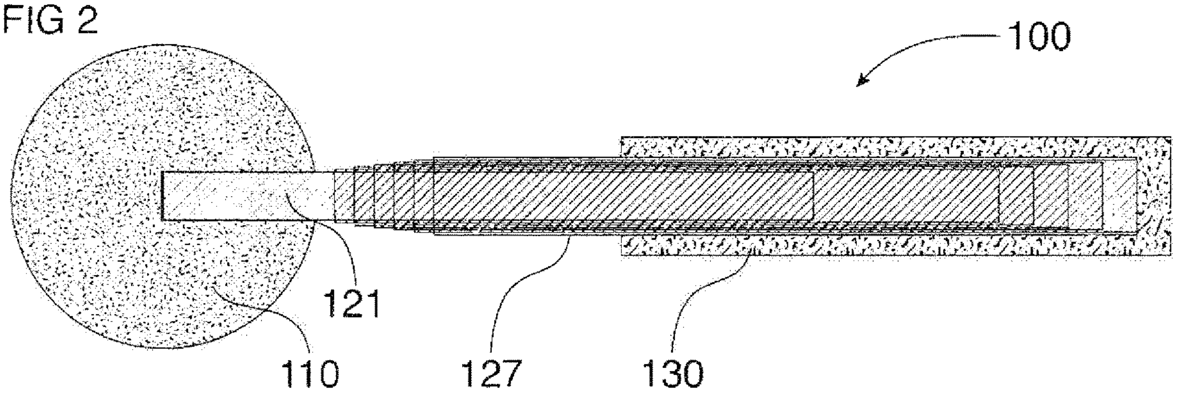
FIG. 2 is a schematic drawing of a cross-sectional side view of the massage tool of FIG. 1.
Figure 3:
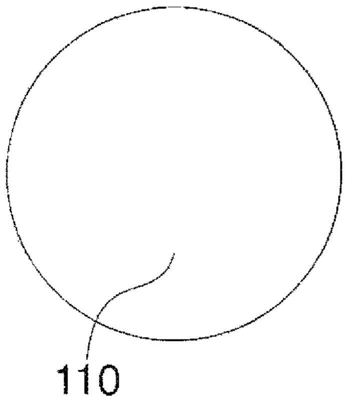
FIG. 3 illustrates a top view of a portion of an outside surface of the ball portion of the massage device of FIG. 1.
Figure 4:
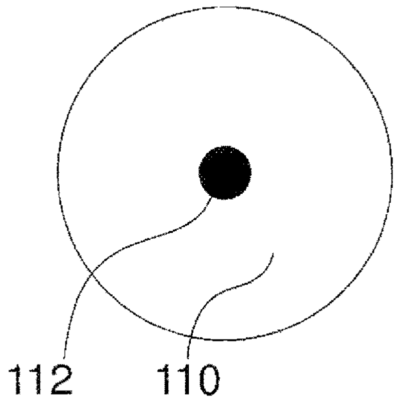
FIG. 4 shows a bottom view of the ball portion of the massage device of FIG. 1, wherein a mounting hole has been drilled radially from an outer surface of the ball into an interior mass of the ball such that the mounting hole can engage with an end of the shaft of the device of FIG. 1.
Figure 5:
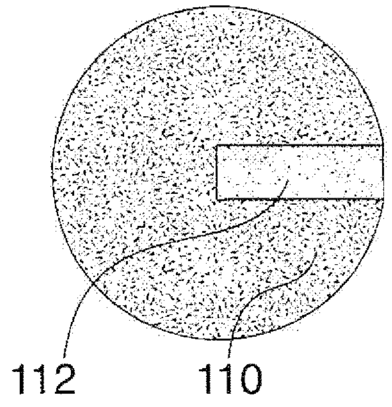
FIG. 5 illustrates a cross-sectional side view of the ball of FIG. 4, the ball having a hollow mounting hole.

FIG. 2 is a cross-sectional side view of the massage tool of FIG. 1 showing the distal end of the shaft engaged with a pressure accessory in the form of a ball. The distal shaft end extends within the pressure accessory such as a ball. As shown in FIG. 4 and FIG. 5, the pressure accessory is a ball having a mounting hole which in certain embodiments, that extends radially from an outer surface of the ball into an interior mass of the ball. In certain embodiments, the mounting hole can be provided with threading or other helical structure used to convert between rotational and linear movement of force, such that the hole can engage with a distal end of the shaft of the device of FIG. 1. The distal shaft end may extend all the way to the center of the pressure accessory or at least part of the distance from its surface to the center of the pressure accessory.

Figure 6:
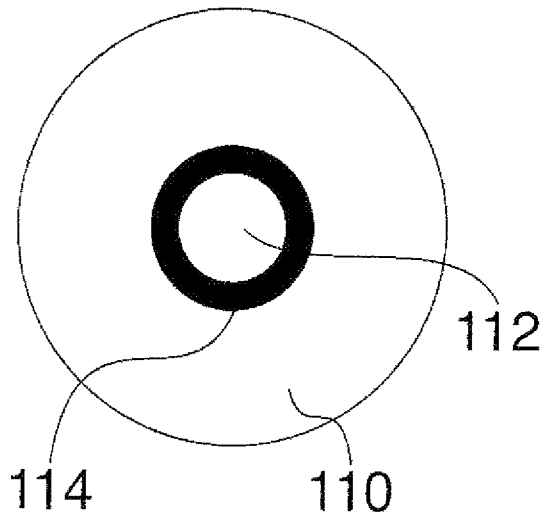
FIG. 6 shows screw threads of the mounting hole capable of engaging with a male end of another element of the device of FIG. 1.
Figure 7A:
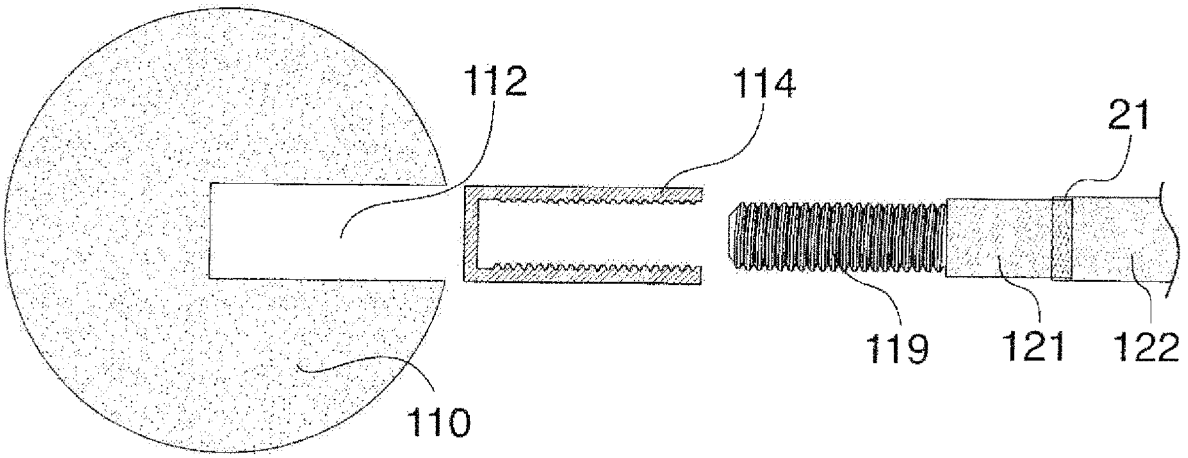
FIG. 7A illustrates a cross-sectional exploded side view of a ball having a mounting hole, a threaded hole liner, and a shaft with a screw end.
Figure 7B:
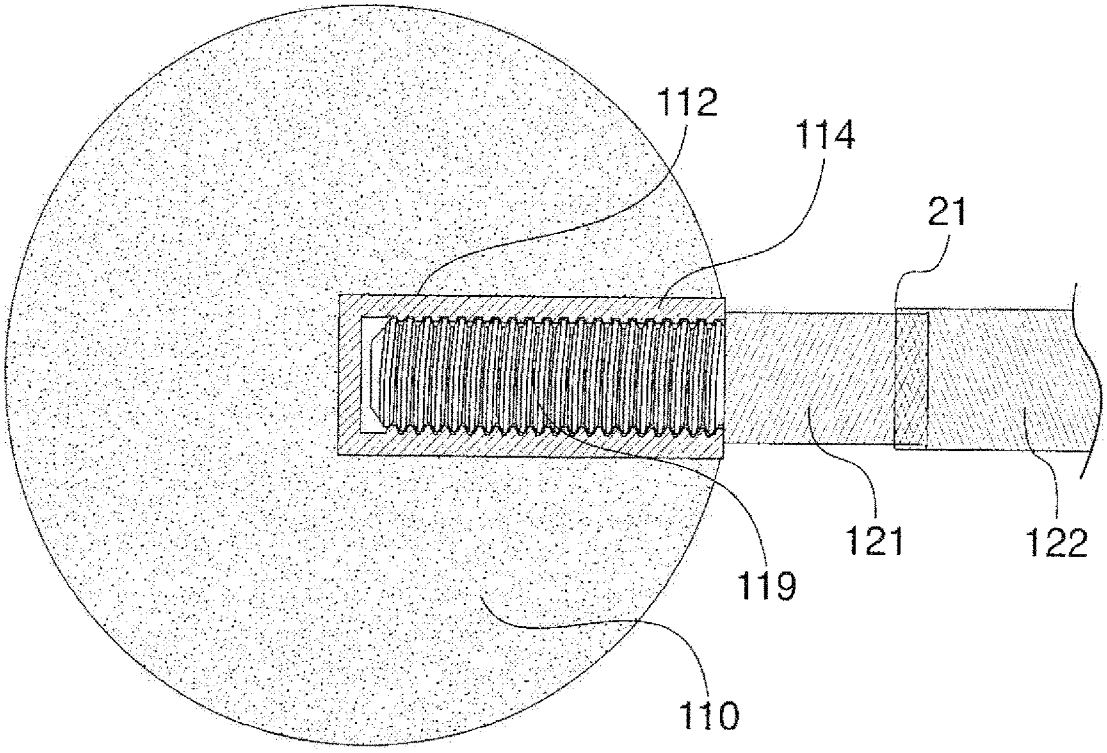
FIG. 7B illustrates a cross-sectional side view of a ball having a threaded mounting hole which is engaged with a screw on the end of the shaft.

The pressure accessory contacts the targeted muscle and thus, in certain embodiments, it is desirable that it provide a firm but comfortable feel when applied to a person, particularly when a therapeutic level of pressure is applied. The pressure accessory comprises a material selected from the list consisting of natural rubber, synthetic rubber, silicone, elastomer, polymer, wood, and plastic. FIG. 6 illustrates a ball 110 having a mounting hole 112, where the inner surface of the hole comprises screw threads or is lined with a screw liner capable of engaging with a male end of another element of the device of FIG. 1. It is, in certain embodiments, desirable to remove the ball on the distal end of the massage tool of the present invention and insert another pressure accessory having a different durometer value, shape, or size. For example, a pressure accessory comprising a ball having a diameter of 3 inches and made of synthetic rubber may be removed and replaced with a ball having a diameter of 2.5 inches and which is made of a silicone material. To facilitate removal of the ball from its connection to the shaft or handle of the device, in certain embodiments, the ball is removably attached to the distal end of the device with a screw or other fastening mechanism. FIG. 7A is a cross-sectional exploded view of a screw on the distal end of the shaft which is capable of mating with a screw liner 114 placed within a mounting hole 112 of the ball 110. FIG. 7B illustrates a cross-sectional side view of a massage device 100 with a ball 110 on its distal end. The ball includes a threaded mounting hole 112 into which is screwed a screw member 119 on a distal end of the shaft 120. The ball 110 may be screwed and unscrewed from the distal end of the shaft 120 which comprises a screw member 119 or another fastening mechanism that mates with a threaded mounting hole 112 of the ball 110.

In certain embodiments, the ball can attach to a screw or other fastening mechanism on a distal end of a handle in applications where it is desired that the ball or other pressure accessory be directly attached to the handle so that the device may be used without a shaft component. For example, in certain embodiments, a shaftless device that comprises a handle directly attached to a pressure accessory can be used for short range treatment applications such as the inside of the forearm area of the body. To allow for versatility in attaching the pressure accessory to either a shaft end or a handle end, the present invention provides that the pressure accessory is replaceably detachable from the distal shaft end or the handle end. Similarly, in certain embodiments, the handle is replaceably detachable from the proximal shaft end. The proximal shaft end comprises a proximal end threading configured to engage the handle which has a mounting hole into which the proximal shaft end is screwed. In certain embodiments, the handle may be removed and one pressure accessory attached to one end of a shaft and a second pressure accessory attached to a second end of the same shaft such that the device is a shaft with two ball attachments.

The shaft of the present invention is telescopic in that it comprises two or more concentric tubular members of differing diameters, which allows for the insertion of each of the sequential concentric tubular segment of one diameter into one having a larger diameter. The concentric tubular segments of the shaft may be retracted or extended with respect to one another fully or partially, allowing the user to change the length of the device as needed. In certain embodiments, the shaft comprises at least two interlocking concentric tubular segments. The interlocking concentric tubular segments comprise interlocking stop ends at the distal end of each concentric tubular segment. The interlocking stop end 21 of device 100 of FIG. 7A prevents two adjacent concentric tubular segments 121, 122 from disengaging from each other completely. The concentric tubular segment 121 having a smaller diameter than the concentric tubular segment 122 comprises an interlocking stop end 21 on its outside circumstance adjacent to its proximal edge and when these segments are extended in relation to one another, extension of the concentric tubular segment 122 occurs up to but not beyond interlocking stop end 21 on concentric tubular segment 121.

In certain embodiments, each of the concentric tubular members is a hollow tube having a wall thickness of 0.06 inches and in some embodiments a wall thickness between 0.02 to 0.2 inches. For an embodiment in which the concentric tubular members comprise stainless steel, a wall thickness of between 0.02 and 0.2 inches provides a surprising combination of mechanical strength and resistance to bending or kinking to support adults having a body weight between 100 and 500 lbs. As would be appreciated, based on the shaft material, the wall thickness may be thicker or thinner and when fully extended, the shaft comprises a length of 3.5 to 4.5 feet. Although the illustrated embodiment of the tool has seven concentric tubular members, certain embodiments have 6 concentric tubular members, other embodiments have 5 concentric tubular members, yet other embodiments have 4 concentric tubular members, and another embodiment has 3 concentric tubular members. When the tool is in the extended position, it is locked into that state due to the friction of the snugly engaged concentric tubular members against each other to prevent inadvertent retraction of the shaft. In certain embodiments, the concentric tubular member proximal to the handle 130 includes an end plug.

Figure 8:
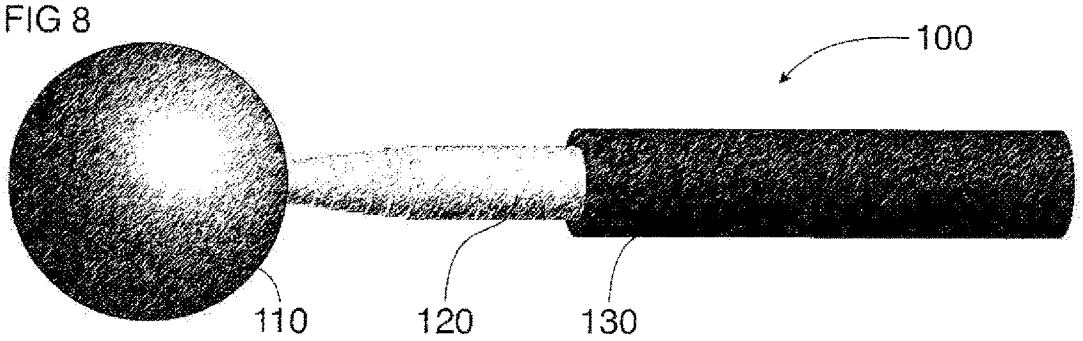
FIG. 8 is a three-dimensional view of the massage tool of FIG. 1 with the shaft in a retracted position.

The pressure accessory may comprise a ball 110, as shown in the embodiment of FIG. 8. Although the device of FIG. 8, illustrated with its shaft 120 fully retracted, shows a ball 110 as the pressure accessory, the pressure accessory in certain embodiments comprise three-dimensional shapes that are spherical, generally spherical, ovoid, or non-spherical, such as a three-dimensional shape having a cubic, cuboid, pyramidal, conical, cylindrical, triangular prism form or segments or sections of these forms. FIGS. 9A through 9G illustrate pressure accessories having various three-dimensional shapes according to certain embodiments.

Figure 9A:
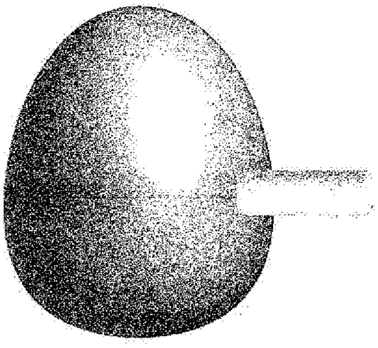
FIGS. 9A-9C are three-dimensional perspective views of a pressure accessory in the shape of three different ovoids.
Figure 9B:
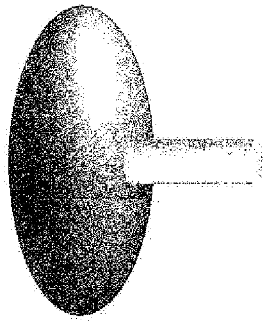
Figure 9E:
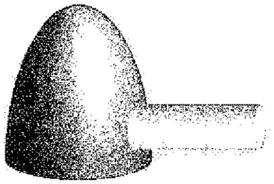
FIG. 9E is a three-dimensional perspective view of a pressure accessory in the shape of a half-ovoid.
Figure 9F:
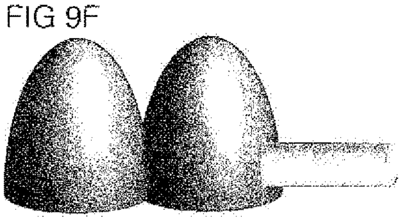
FIG. 9F is a three-dimensional perspective view of a pressure accessory in the shape of two half-ovoids.
Figure 9C:
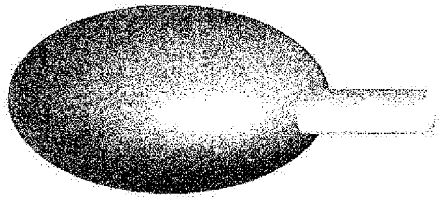
Figure 9G:
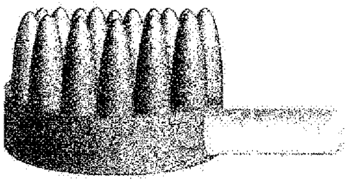
FIG. 9G is a three-dimensional perspective view of a pressure accessory comprising a cluster of a plurality of protrusions.
Figure 9D:
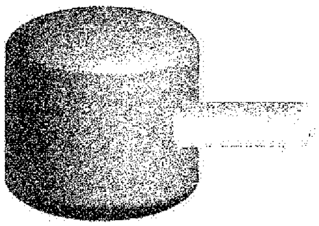
FIG. 9D is a three-dimensional perspective view of a pressure accessory in the shape of a cylinder with rounded edges.
Figure 9H:
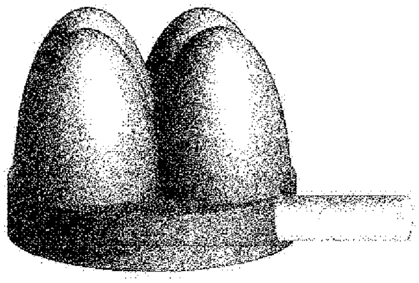
FIG. 9H is a three-dimensional perspective view of a pressure accessory in the shape of a cluster of four half-ovoids.

FIGS. 9A, 9B, and 9C illustrate three ovoid shaped pressure accessories. FIG. 9D illustrates a pressure accessory in the shape of a cylinder with rounded edges. FIG. 9E illustrates a pressure accessory comprising a half-ovoid and FIG. 9F illustrates a pressure accessory comprising two half-ovoids side by side. FIG. 9G shows a pressure accessory comprising a multitude of nubs or protrusions and FIG. 9H shows a pressure accessory comprising a cluster of four half-ovoids.

In certain embodiments, the ball or other pressure accessory has a diameter in the range from 60 mm to 80 mm. In certain embodiments, the ball is 68 mm, which the inventor has discovered through extensive testing, is an especially suitable size for most adults. In one embodiment, the ball is 68 mm and is made of a synthetic rubber. Such size provides the advantage that when the user bears his weight on the ball which is placed between the back and a floor surface, for example, the ball is of sufficient diameter that the weight of the user is distributed over the area of the ball to provide firm yet comfortable pressure against the back. In other embodiments, it is desirable that the pressure accessory is a ball small enough to rest comfortably in certain contoured areas or concavities of the body, such as in the upper back adjacent to the shoulder blade.

In certain embodiments, the ball size is 60 mm to accommodate the anatomy of a child or a person with a slight build. However, a ball accessory having a diameter smaller than 60 mm would likely not provide enough space between the user and the floor or wall surface since it is desired that the diameter of the ball be greater than the height of the arch of the user's back. As discovered by the inventor, targeted and therapeutic pressure is facilitated when the size of the ball is at least equal to or greater than the height of the arch of the back of the user, such arch distance being measured when the user is lying on the floor with the back against the ground. In one embodiment, a ball having a diameter of 68 mm is a suitable size for most adults. Through extensive testing of a myriad of ball diameters, the inventor has discovered that if the diameter of the ball is less than the height of the arch of the user's back, the user may experience the ball as pointy, sharp, or otherwise, uncomfortable or painful. While not wishing to be bound by theory, it is believed that for balls having a diameter less than 60 mm, for most adults, the ball does not have enough surface area to distribute the user's weight evenly, resulting in a pressure as measured in pounds per inch that is too high to be comfortable.

In certain embodiments, the invention is directed to a kit comprising at least two pressure accessories comprising two balls. In certain embodiments, the first ball accessory has a diameter of 60 mm and the second ball accessory has a diameter between 65 mm and 80 mm. In other embodiments, the kit comprises two balls, the first ball having a diameter of 68 mm and the second ball having a diameter between 70 to 80 mm or has a diameter of 75 mm. In some embodiments, the two pressure accessories have the same or different Shore durometer values. In one embodiment, a first ball having a diameter less than 68 mm has a Shore durometer value that is less than a ball accessory having a diameter of 68 mm, 70 mm, 75, mm, or 80 mm. The ball may have an average Shore durometer in the range of 30 to 100. Through extensive testing, the inventor has discovered that a Shore durometer of 70 for a ball having a diameter of 80 mm provides excellent therapeutic pressure that effectuates trigger point release. Through testing, the inventor has discovered that a Shore durometer value of 30 provides inadequate firmness and support to mimic a therapist's manual application of pressure to effectuate trigger point release. A ball having a Shore durometer of 90 or even 100 generally result in excessive hardness as perceived by the user when used as a pressure accessory for the device of the present invention.

The pressure accessory may be constructed of a single material and have a uniform physical or mechanical characteristic, such as hardness or softness as measured by Shore durometer values. The ball or other pressure accessory may be solid, a matrix that is part solid and part porous such as cork, or air-filled such as an inflatable extruded plastic. The ball or other pressure accessory may alternatively be constructed of one material on its outer surface with a second material for its bulk interior. One or more of the materials used to construct the pressure accessory may have a smooth surface or surface protrusions, irregularities, contouring, or other texturing to provide a desired level of friction, strength, hardness, and/or elasticity. In certain embodiments, the ball or other pressure accessory comprises at least one material selected from the group consisting of a plastic, elastomer, foam, EVA polymer, polyurethane foams, sponges, synthetic or natural rubber, silicone, siliconized rubber, vulcanized rubber, biodegradable polymers, synthetic or genuine leather, rubber or leather composites, compressed paper, fabric, and surface-treated polymerics.

In certain applications, it may be desirable to have relatively softer or harder materials to provide fine-tuned pressure applications to trigger points within the body. As such, the outer surface of the pressure accessory can be a laminate or composite or have discrete and/or continuous sections made of two materials having the same or different Shore durometer values. In one embodiment, the ball may comprise a first region and a second region and the first and second region each independently comprise at least 10% of the outer surface of the pressure accessory. The first region may have a first average Shore durometer and the second region have a second average Shore durometer. The difference between the first and second average Shore durometers, in one embodiment, is greater than 10. In other embodiments, the outer surface of the pressure accessory comprises a plurality of protrusions in the form of, for example, half-spheres, rounded bumps, nubs, or spikes, wherein the protrusions have a first average Shore durometer, the pressure accessory has a second average Shore durometer, and the difference between the first and second average Shore durometers is greater than 10.

Figure 10:
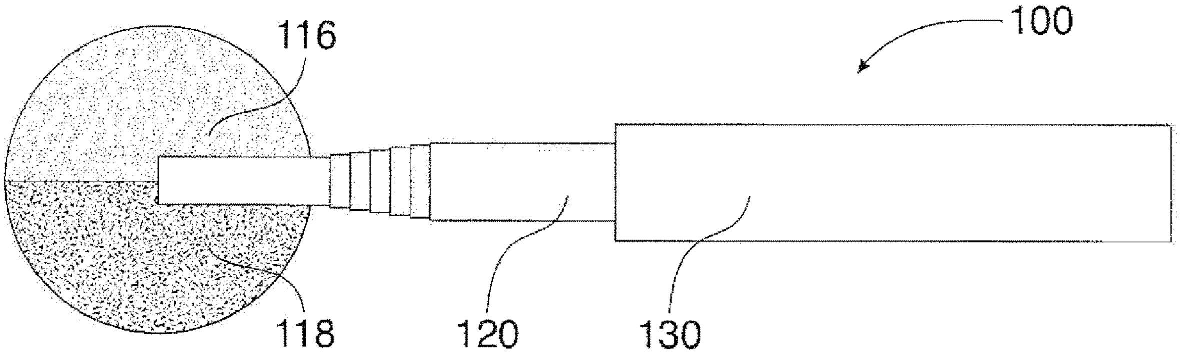
FIG. 10 is a schematic drawing of a side view of a massage tool of the present invention showing a ball portion and a handle portion on either side of an extendable shaft portion, which is in an unextended or retracted position and the ball portion is a composite of two half-spheres made of different materials.

FIG. 10 is a cross-sectional side view of a massage device 100 according to one embodiment of the invention. The pressure accessory is a ball comprising two regions 116, 118 made of two materials having different Shore durometer values. The ball has a first region is a semi-sphere comprising a first material 116 and a second region 118 is a semi-sphere comprising a second material having a Shore durometer value that is lower than that of the first material. In one embodiment, the first material of the first region is a hard rubber, polymer, or plastic material that retains its shape when pressed against the body and the second material of second region is an elastomer or other softer material that deforms to a greater extent than the first material. In one embodiment, when a massage device is first placed on a trigger point, an area of the ball made of the softer, more pliable material having a lower Shore durometer value is utilized with the application of sustained pressure to loosen and lengthen constricted fascia without causing undue pain. This process breaks down adhesions between the tissues and softens and re-aligns them, freeing up muscles and allowing easier and more effective movement. Once the trigger point releases, the user may utilize the area of the ball with the harder material, in certain embodiments, to target small areas with greater precision and granularity so that smaller, knotted areas of sarcomere can be accessed. By switching between a softer and harder material and adjusting the amount and duration of pressure that is applied, the individual user can achieve finely tuned release of trigger points.

Figure 11A:
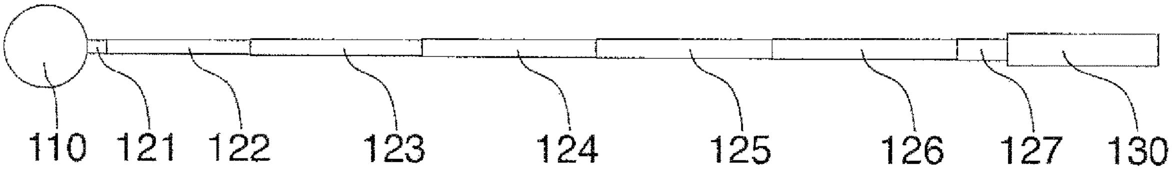
FIG. 11A is a schematic side view of a massage device of the present invention showing a ball portion and a handle portion on either side of a shaft portion, which is in an extended position and shows multiple conically tubular segments that make up the shaft portion.

FIG. 11A shows the device 100 in a fully extended position wherein the concentric tubular segments have been longitudinally extended with respect to one another. The shaft 120 of FIG. 11A comprises seven concentric tubular segments, which are arranged from the distal to the proximal end of the device 100 in order of ascending diameter of the segments: a first segment 121, a second segment 122, a third segment 123, a fourth segment 124, a fifth segment 125, a sixth segment 126, and a seventh segment 127, which is detachably connected to the handle 130.

Although there can be as few as two concentric tubular segments, as shown in FIG. 11A, the fully extended shaft 120 comprises seven concentric tubular segments with each concentric tubular segment having a diameter, wherein the diameter of each tubular segment is different from one another, and the extendable and retractable shaft 120 in its extended state has a tapered longitudinal axis profile from the proximal shaft end to the distal shaft end.

Figure 11B:
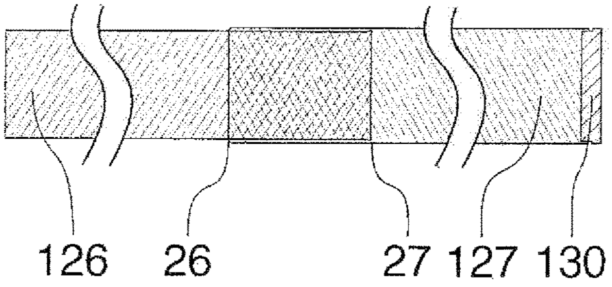
FIG. 11B is a side view of the shaft showing interlocking stop ends of three adjacent concentrically tubular elements that form the shaft of the present invention.
Figure 12:
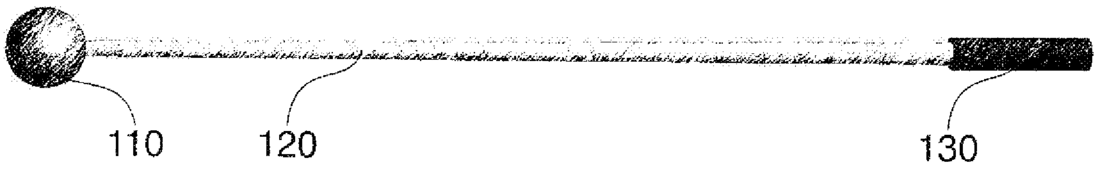
FIG. 12 is a three-dimensional side view of a massage device of the present invention showing a ball portion and a handle portion on either side of a shaft portion, which is in an extended position and shows multiple conically tubular segments that make up the shaft portion.

An exploded view of the interlocking stop ends 26, 27 of adjacent concentric tubular segments is shown in FIG. 11B. The interlocking stop ends 26, 27 of device 100 of FIG. 7A prevent two adjacent concentric tubular segments 126, 127 from disengaging from each other completely. The concentric tubular segment 126 having a smaller diameter than the concentric tubular segment 127 comprises an interlocking stop end 26 on its outside circumstance adjacent to its proximal edge and when these segments are extended in relation to one another, extension of the concentric tubular segment 127 occurs up to but not beyond interlocking stop end 26 on concentric tubular segment 126. FIG. 12 is a three-dimensional view of the fully extended device 110 of FIG. 8.

Figure 13:
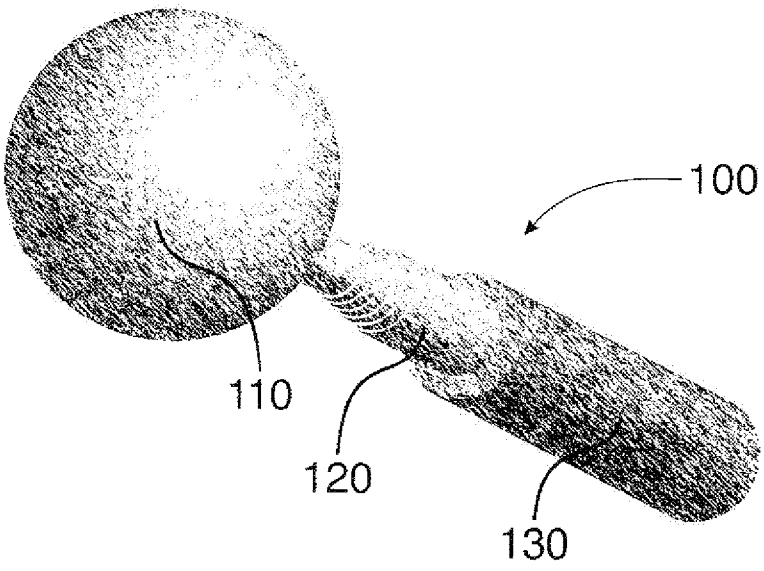
FIG. 13 is a three-dimensional perspective view of a massage tool with the shaft portion of the tool in a retracted or unextended position.
Figure 14:
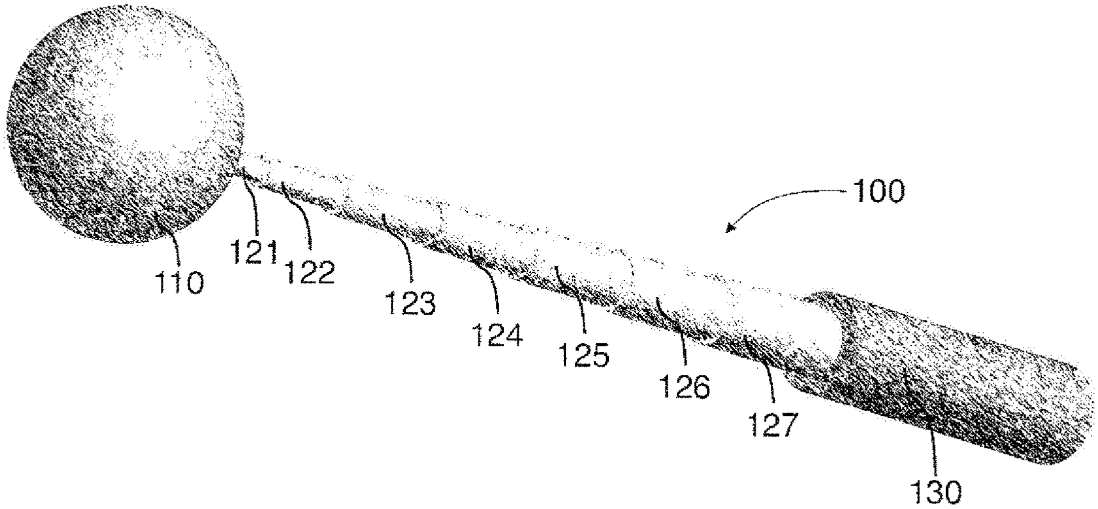
FIG. 14 is a three-dimensional perspective view of a massage tool of FIG. 8, showing the shaft portion of the tool in an extended position and showing the multiple conically tubular segments that make up the shaft portion.

A three-dimensional perspective view of the device 100 in its fully retracted and fully extended states is shown in FIGS. 13 and 14, respectively. The tubular segments, in certain embodiments, have interlocking stop ends to enable adjacent tubular segments to be extended longitudinally with respect to one another or retracted such that a concentric tubular segment of a small diameter is placed within the hollow interior space or lumen of a concentric tubular segment having a larger diameter.

In another aspect, the present invention is directed to a massage system kit comprising an adjustable massage appliance having the features discussed above, a handle connected to the proximal shaft end, and a pressure accessory connected to the distal shaft end. The distal shaft end comprises distal end threading configured to engage a pressure accessory threading connected to the pressure accessory. Further, the massage system comprises a pressure accessory that is replaceably detachable from the proximal shaft end and the pressure accessory is replaceably attachable to the handle. An end of the handle comprises threading is configured to engage the pressure accessory threading connected to the pressure accessory. The massage system may or may not include a second accessory having a second pressure accessory threading configured to engage a distal shaft end threading or a distal end threading of the pressure accessory. If the device has two pressure accessories, in certain embodiments, the first pressure accessory is a ball having a first diameter, the second pressure accessory is a ball having a second diameter, and the first diameter is more than 20% different than the second diameter. Further, in certain embodiments, instead of or in addition to a difference in diameter, the device may comprise two balls of different Shore durometer values, where the first ball has a first average Shore durometer, the second ball has a second average Shore durometer, and the difference between the first and second average Shore durometers is more than 10. In certain embodiments, the kit comprises a replaceably detachable first ball having a first diameter, a replaceably detachable second ball having a second diameter, and a replaceably detachable third ball having a third diameter. In certain other embodiments, the kit comprises a conically shaped pressure accessory. In other embodiments, the kit comprises two or more pressure accessories having Shore durometer values that are different, comprise densities that are different from one another, or comprise three-dimensional shapes that are different from one another.

The following examples illustrates methods of administering massage therapy on numerous areas of the body using the massage tool of the present invention. Although the following examples and techniques may be utilized by a practitioner on the patient, they are especially suited and created for self-administered massage therapy. The tools of the present invention allow users to massage their own muscles as deeply as they need. When a practitioner is working on the muscle of a patient, in order to prevent further pain or injury, he typically cannot apply deep pressure and/or apply pressure in the wrong area and not directly on the trigger point. The present invention allows the user to massage the muscle very deeply and in the correct and exact spot desired. Specific exemplary procedures for massage therapy on trigger points in different parts of the body are provided in the following examples. A trigger point release map, shown as a cluster of points on the body, is provided for a myriad of regions of the body in Examples 1-12, infra. These maps provide more than a methodology for releasing a single trigger point. They provide, through textual and visual guidance, a methodology for releasing trigger points in that entire region. Through extensive experimentation, the inventor has developed a trigger point release map shown as a cluster of points, that when the device is applied sequentially, results in therapy of an entire region of the body, which in most instances, contains multiple trigger points. This differential positioning of the device in sequential fashion by adjusting the position of the device through small movements illustrated in the text and figures of the Examples below, was developed through extensive research and experimentation.

Surprisingly, the invention has discovered that when the device is used to treat a known trigger point by the user, the user may become aware of other previously imperceptible or weakly perceptible trigger points that exist adjacent to or in the same anatomical region, e.g., upper back area. By sequentially using the device and methods of the present invention, first on a known trigger point, then other points as shown on the cluster maps provided in the following examples, an user can identify and release trigger points in an entire anatomical region such that long lasting and complete pain relief is realized. While not wishing to be bound by theory, it is believed that it is rare that a user suffering from pain, stiffness, or discomfort, has a trigger point requiring treatment, but that, other sarcomeres and muscular structures in the same region, e.g., shoulder, could benefit from massage therapy even if overt symptoms are not yet perceived by the user. By following the methods and instructions provided below, the inventor has surprisingly discovered that during the course of following the cluster point map, the device helps a user identify additional, previously unknown trigger points (whether they were too small in size or failed to meet an individual user's specific pain threshold) such that an entire anatomical area may be treated and cleared of trigger points.

Without wishing to be bound by theory, it is believed that the mechanisms whereby trigger points form include restricted blood flow, tension, and contractions, which are conductive to the creation of multiple tender, sensitive muscles in the body. Millions of microscopic muscle fibers called sarcomeres must contract within the muscles to create even the smallest movement. A trigger point exists when over-stimulated sarcomeres become unable to release their contracted state. Restricted blood flow results in oxygen starvation and the accumulation of waste products of metabolism, which in turn cause the trigger point to send out pain signals until the brain institutes a policy of rest for the muscle. Limiting the use of the muscle, however, further reduces oxygenation and circulation, which in turn causes muscle fibers to shorten and tighten up, resulting in pain.

A professional body worker can push on the areas of the muscles which need therapy, but a patient can only withstand an amount of pressure which is comfortable. The tools of the present invention allow the user to apply their desired amount of pressure, which may be significantly more than the body worker could comfortably do. This is due to the process where self-administered sensory input causes less distress when compared to the same sensory input by another. A good example is that an individual typically cannot tickle him or herself because that person's actions and nervous system are in sync. Studies at the University College London have shown that the cerebellum predicts the sensation and this prediction is used to cancel the response of other brain areas to the tickle. Similarly, the devices of the presentation invention utilize these sensory principles to allow a person to self-administer therapy more comfortable since the person already knows what to expect in terms of pressure and pain. In contrast, the unpredictability of another person massaging muscles may make the individual more sensitive to touch and feel discomfort more easily, which causes muscle tension.

Figure 15:
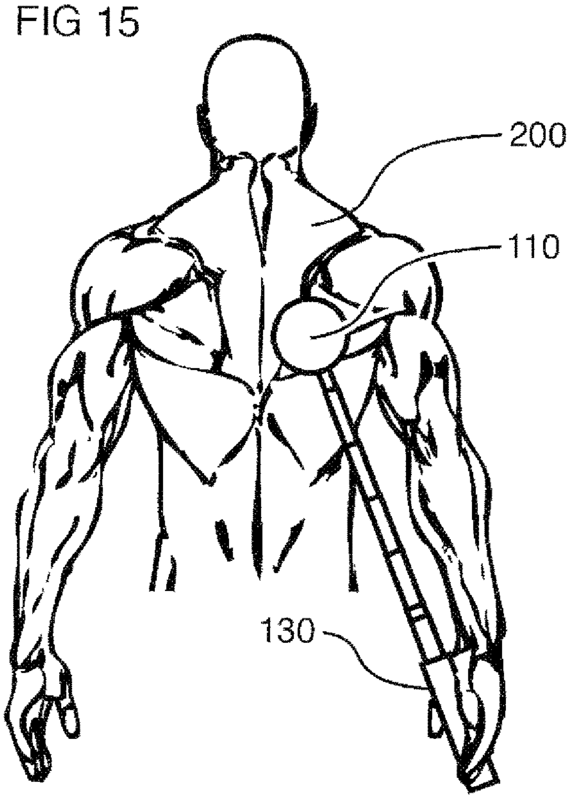
FIG. 15 is an illustration of a massage tool of the present invention placed on the upper back of a person and showing the shaft of the tool in a fully extended position.
Figure 16:
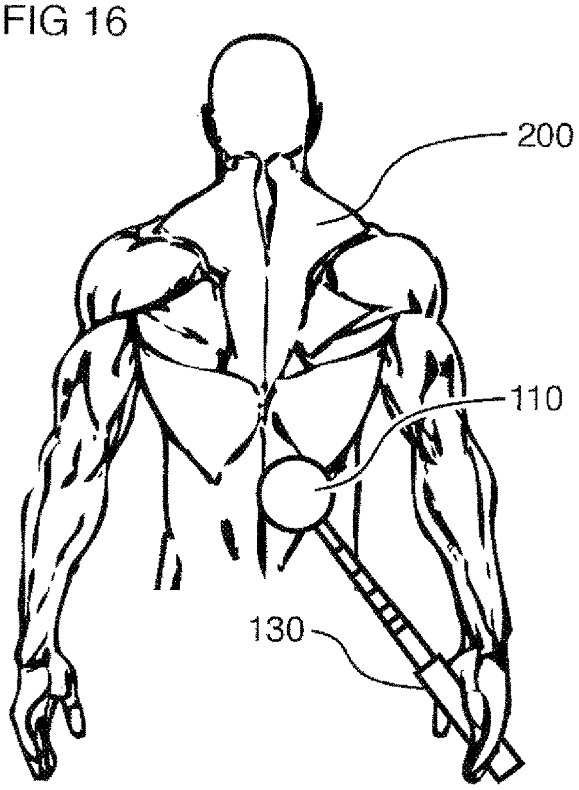
FIG. 16 is an illustration of a massage tool showing the shaft in a partially extended position and placed in an alternative position on the lower back of a person.
Figure 17:
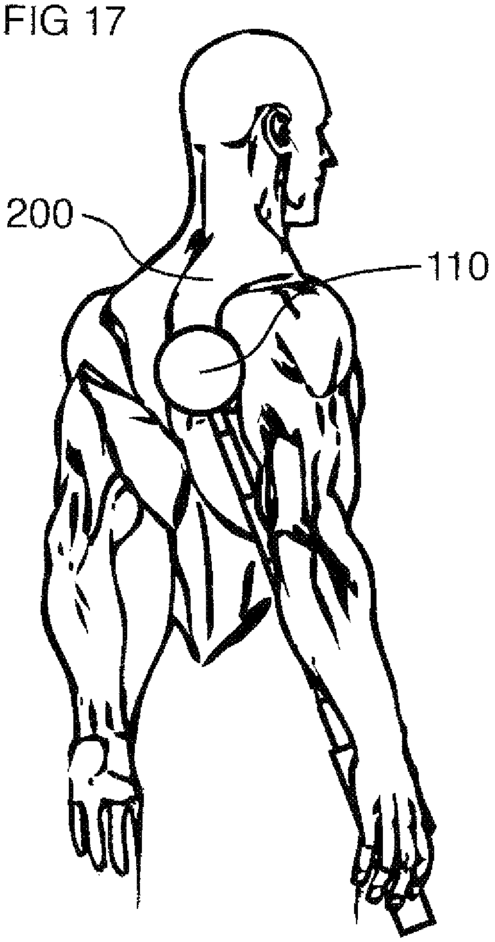
FIG. 17 is three-quarter side view illustration of the embodiment of the tool that is in an extended position and placed on the upper back of a person.
Figure 18:
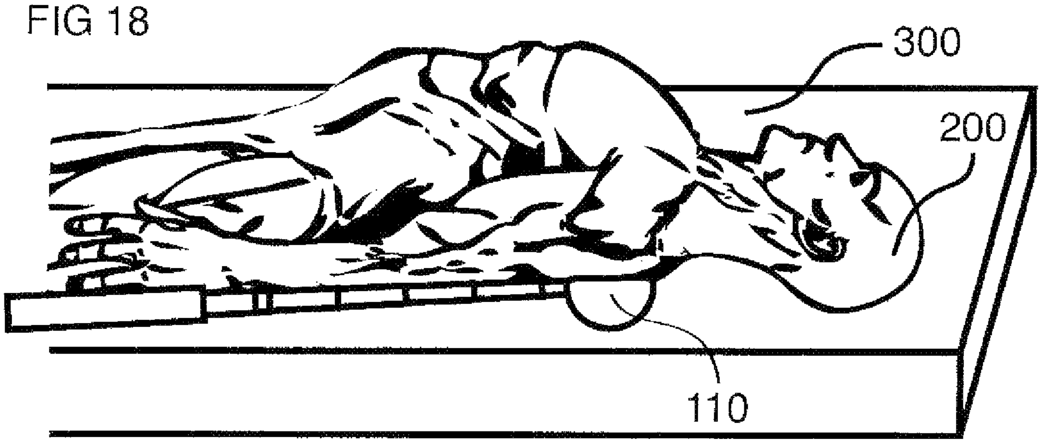
FIG. 18 is a perspective view illustrating use of the tool on a massage table or floor surface with the ball portion of the tool placed beneath a person.
Figure 19A:
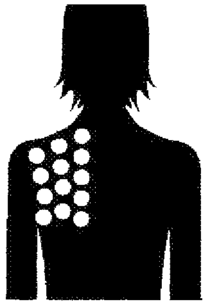
FIG. 19A is an illustration showing ball placement positions for treatment of the upper back with the massage device of the present invention.
Figure 19B:
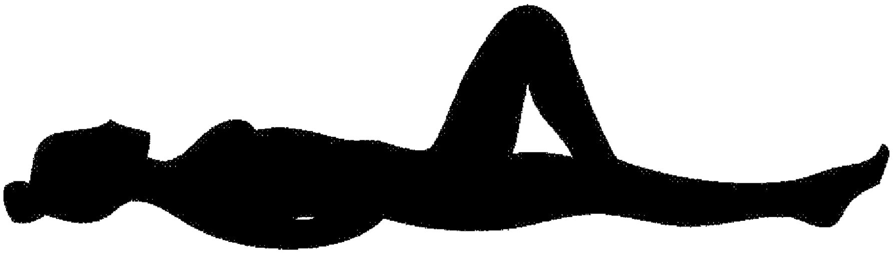
FIG. 19B is an illustration of supine body positioning for treatment of the upper back.

The general procedure that applies to the specific treatment protocols, below, is as follows: hold on to the handle in one hand and grab on the ball with the other hand, then extend the pole to any length needed. The length of the pole can be adjusted at any time during the procedure. Place the ball under the body on the desired muscle and/or area and allow the body weight to compress the ball onto the muscle. The user can move his/her body and or limbs which makes the ball roll on the muscle and helps the muscle to relax, to release toxins such as lactic acid and relieve tightness. FIGS. 15 to 18 show illustrative positions of the device as self-administered by an individual on various areas of the back. FIG. 15 is an illustration of a massage tool of the present invention placed on the upper back of a person and showing the shaft of the tool in a fully extended position. FIG. 16 is an illustration of a massage tool showing the shaft in a partially extended position and placed in an alternative position on the lower back of a person. FIG. 17 is three-quarter side view illustration of the embodiment of the tool that is in an extended position and placed on the upper back of a person. FIG. 18 is a perspective view illustrating use of the tool on a massage table or floor surface with the ball portion of the tool placed beneath a person.

Example 1—Upper Back Therapy

Figure 20A:
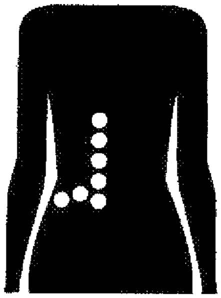
FIG. 20A is an illustration showing ball placement positions for treatment of the lower back with the massage device of the present invention.
Figure 20B:
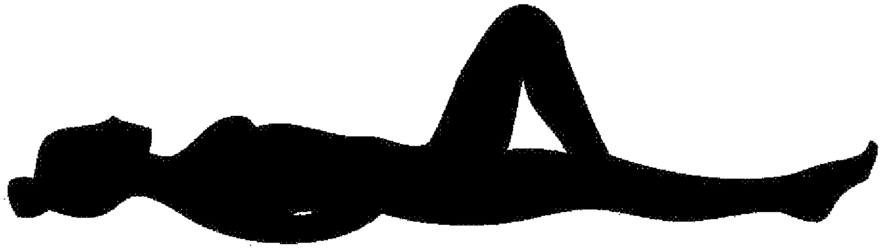
FIG. 20B is an illustration of supine body positioning for treatment of the lower back.

As illustrated in FIGS. 20A and 20B, lay on your back on the floor. Bend the leg on the side to be worked by placing that foot flat on the floor. Expand the shaft to the estimated desired length. Roll your body up sideways enough to place the ball under your back in the desired location. Roll your body down onto the ball. You can control the amount of pressure by moving the upward pointed knee left or right. Moving your bent leg towards the center of the body lessens the pressure on the ball and moving the bent leg towards the outside of the body increases the pressure on the ball. You may need to lengthen or shorten the shaft to a comfortable length. Being able to reach the handle with a straight relaxed arm is best, whereby you can easily hold the handle end. 1. Once the ball is in place rotate your extended arm slowly in a circular counterclockwise direction. 2. Next, rotate your extended arm slowly in a circular clockwise direction. At any time, you can always leverage your bent leg to apply more or less pressure on the muscle. 3. Then hold your extended arm straight above your head while gently rocking it in a waving motion about 12 inches left and right. 4. Extended your arm straight out to your side you are working on, then slowly rock it about 12 inches up and down parallel to the floor from head to toe. 5. Extend your arm straight out to your side bending your elbow, then slowly move your hand so that the back of your hand and then the front of your hand alternately touches the floor. This action rotates your shoulder. 6. When you are finished, then roll up your body again by using your bent knee to twist your body and place the ball in a new location. Roll your body down onto the ball in its new location. Repeat steps 1 thru 6. Repeat the steps on all the muscles of your upper back. The difference of one inch in distance of the ball position can make a big difference and finding muscle tension.

Example 2—Lower Back Therapy

Figure 21A:
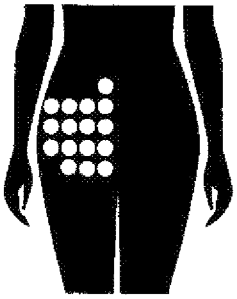
FIG. 21A is an illustration showing ball placement positions for treatment of the gluteus and *piriformis* muscles with the massage device of the present invention.

As shown in FIG. 21A, an embodiment of the present invention provides trigger point therapy on the lower back, particularly between the bottom rib and the top of the sacrum.

Figure 21B:
FIG. 21B is an illustration of supine body positioning for treatment of the gluteus and *piriformis* muscles.

As shown in FIG. 21B, lay on your back on the floor. Bend the leg on the side to be worked by placing that foot flat on the floor. Expand the shaft to the estimated desired length. Roll your body up sideways enough to place the ball under your lower back in the desired location. Roll your body down onto the ball. You can control the amount of pressure by moving the upward pointed knee left or right. Moving your bent leg towards the center of the body lessens the pressure on the ball and moving the bent leg towards the outside of the body increases the pressure on the ball. You may need to lengthen or shorten the shaft to a comfortable length. Being able to reach the handle with a straight relaxed arm is best, whereby you can easily hold the handle end. 1. Place the ball at the bottom edge of your lowest rib bone. 2. Lift your leg, which is on the same side as the ball, to your chest and then slowly rotate your leg in a circular clockwise direction. Use your knee as a guide to make circles in the air. 3. Next, slowly rotate your leg in a circular counterclockwise direction. At any time, you can always leverage your leg to apply more or less pressure on the muscle. 4. While keeping your knee bent, splay your leg out away from the center of your body, then gently rock it in a waving motion. 5. Pull your knee tightly into your chest and hold that position for a bit. 6. When you are finished, then roll up your body again by using your bent knee to twist your body up and over, then place the ball in the next position (7). Then once that step is completed, do step 8. Roll your body down onto the ball in its new location. 7. Place the ball at the top edge of your sacrum and repeat steps 1 thru 6. 8. Place the ball in the middle of your lower back right on the belly of the muscle and repeat steps 1 thru 6. Repeat the steps on all the muscles of your lower back. The difference of one inch in distance of the ball position can make a big difference and finding muscle tension. Feel free to explore everywhere on your body. Spend as much time as you want massaging the muscle in each location.

Example 3—Gluteus and *Piriformis* Muscle Therapy

Figure 22A:
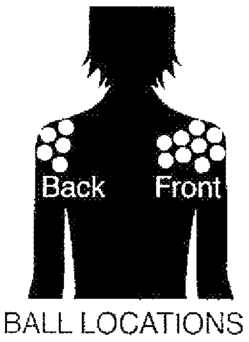
FIG. 22A is an illustration showing ball placement positions for treatment of the should with the massage device of the present invention.

As shown in FIG. 22A, an embodiment of the present invention provides trigger point therapy of the gluteus and *piriformis* muscle, otherwise known as the buttocks or the "butt" area.

Figure 22B:
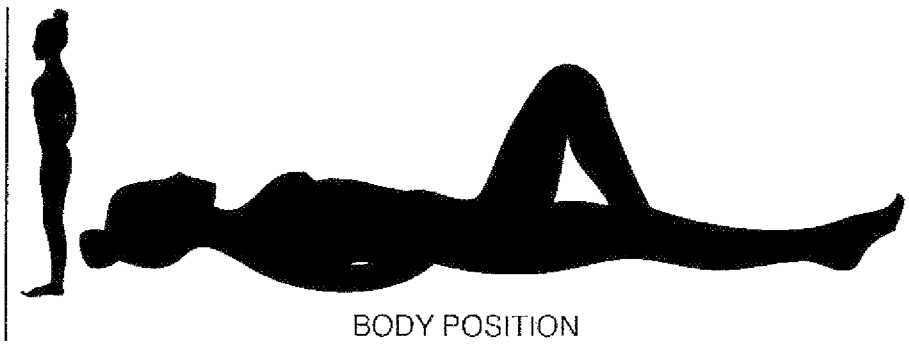
FIG. 22B is an illustration of standing and supine body positioning for treatment of the shoulder.

As shown in FIG. 22B, lay on your back on the floor. Bend the leg on the side to be worked by placing that foot flat on the floor. Expand the shaft to the estimated desired length. Roll your body up sideways enough to place the ball under your butt in the desired location. Roll your body down onto the ball. You can control the amount of pressure by moving the upward pointed knee left or right. Moving your bent leg towards the center of the body lessens the pressure on the ball and moving the bent leg towards the outside of the body increases the pressure on the ball. You may need to lengthen or shorten the shaft to a comfortable length. Being able to reach the handle with a straight relaxed arm is best, whereby you can easily hold the handle end. 1. Place the ball under your butt. 2. Lift your leg, which is on the same side as the ball, to your chest and then slowly rotate your leg in a circular clockwise direction. Use your knee as a guide to make circles in the air. 3. Next, slowly rotate your leg in a circular counterclockwise direction. At any time, you can always leverage your leg to apply more or less pressure on the muscle. 4. While keeping your knee bent, splay your leg out away from the center of your body, then gently rock it in a waving motion. 5. Pull your knee tightly into your chest and hold that position for a bit. 6. When you are finished, then roll up your body again by using your bent knee to twist your body up and over, then place the ball in another spot on the butt. Then roll your body down onto the ball in its new location and repeat steps 1 thru 6. Repeat the steps on all the muscles of your butt. The difference of one inch in distance of the ball position can make a big difference and finding muscle tension.

Example 4—Shoulder Therapy

Figure 23A:
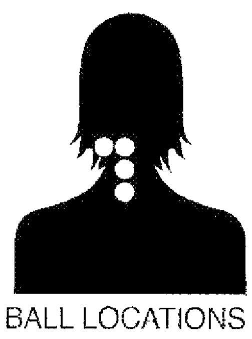
FIG. 23A is an illustration showing ball placement positions for treatment of the neck with the massage device of the present invention.

As shown in FIG. 23A, an embodiment of the present invention provides trigger point therapy of the back and front areas of the shoulder and also the pectoral muscles.

Figure 23B:
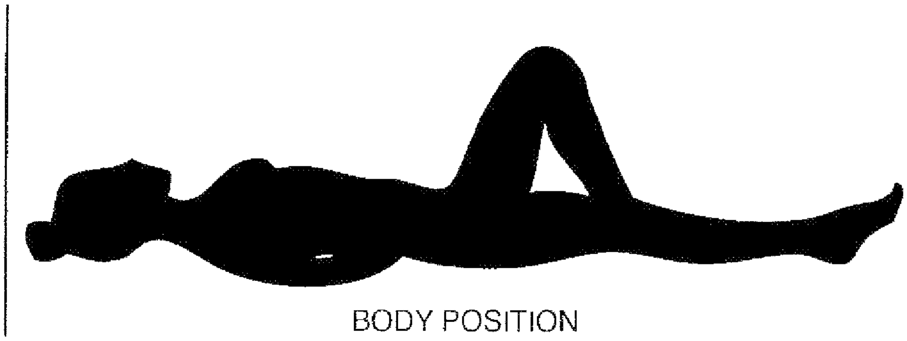
FIG. 23B is an illustration of supine body positioning for treatment of the neck.

As shown in FIG. 23B, lay on your back on the floor or up against a sturdy wall (a doorway jam works well). On the floor, bend the leg on the side to be worked by placing that foot flat on the floor. Expand the shaft to the estimated desired length. Roll your body up sideways enough to place the ball under your back in the desired location. Roll your body down onto the ball. You can control the amount of pressure by moving the upward pointed knee left or right. Moving your bent leg towards the center of the body lessens the pressure on the ball and moving the bent leg towards the outside of the body increases the pressure on the ball. You may need to lengthen or shorten the shaft to a comfortable length. Being able to reach the handle with a straight relaxed arm is best, whereby you can easily hold the handle end. The device can be used against the wall is to bend your knees slightly while placing the ball between your body and the wall while holding the handle with hand opposite to the shoulder you will be working. 1. Once the ball is in place extend the arm with the ball on the back shoulder and then the on the front of the shoulder including the pectoral muscle Fully and rotate this extended arm slowly in a circular clockwise direction. At any time, you can always leverage your leg to apply more or less pressure on the muscle. If using the wall technique, keep holding the handle of the Tool while in use. At any time, you can always leverage your bent legs to apply more or less pressure on the muscle by pushing your body into the wall. 2. Next, fully and rotate this extended arm slowly in a circular counterclockwise direction. At any time, you can always leverage your leg to apply more or less pressure on the muscle. If using the wall technique, keep holding the handle of the Tool while in use with the opposite hand to the side being worked on At any time you can always leverage your bent legs to apply more or less pressure on the muscle by pushing your body into the wall. 3. Extended your arm straight out to your side you are working on, then slowly move it up and down head to toe. 4. While your arm is fully extended out to the side rotate back and forth it as if to screw in a light bulb. 5. When you are finished with one side, then do the other side. Repeat steps 1 thru 4. Repeat the steps on all the muscles of your shoulder and pectoral muscles. The difference of one inch in distance of the ball position can make a big difference and finding muscle tension.

Example 5—Neck Therapy

Figure 24A:
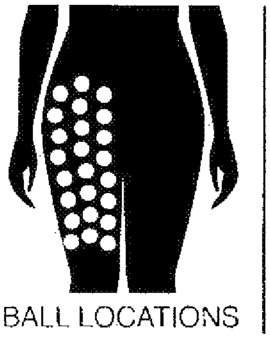
FIG. 24A is an illustration showing ball placement positions for treatment of the quadriceps with the massage device of the present invention.

As shown in FIG. 24A, an embodiment of the present invention provides trigger point therapy of the neck and between the shoulder on either side of the spine including the base of the skull.

Figure 24B:
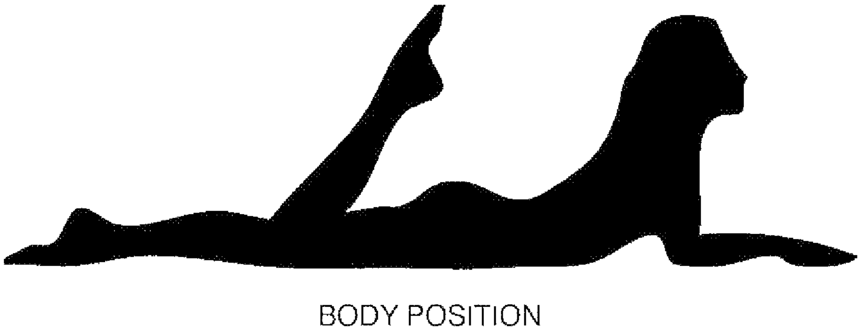
FIG. 24B is an illustration of body positioning for treatment of the quadriceps.

As shown in FIG. 24B, lay on your back on the floor. Bend the leg on the side to be worked by placing that foot flat on the floor. Expand the shaft to the estimated desired length. Roll your body up sideways enough to place the ball under your neck in the desired location from the other side of your body. The handle is held by the opposite hand to the side of the neck you are working. Roll your body down onto the ball. You can control the amount of pressure by pulling you chin into your chest. This action straightens the cervical vertebrae allowing the ball to have better contact. Moving your bent leg towards the center of the body lessens the pressure on the ball and moving the bent leg towards the outside of the body increases the pressure on the ball. You may need to lengthen or shorten the shaft to a comfortable length. Being able to reach the handle with a straight relaxed arm is best, whereby you can easily hold the handle end. 1. Once the ball is in place gently move your head in a back and forth motion as if you were shaking it to say no. 2. When you are finished, then roll you head off the ball enough so you can place the ball in a new location. Repeat steps 1.

Repeat the steps on all the muscles of your neck. The difference of half an inch in distance of the ball position can make a big difference and finding muscle tension. Also put the ball at the bottom of your skull to get the occipital muscles.

Example 6—Quadricep Therapy

Figure 25A:
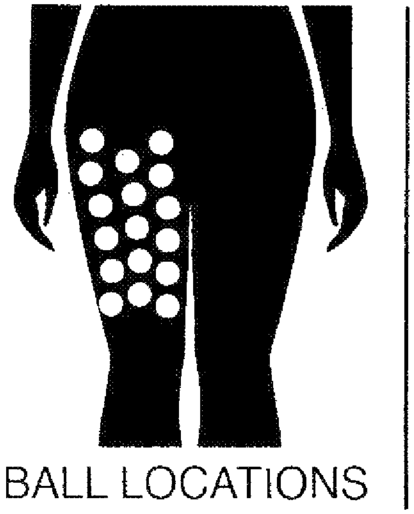
FIG. 25A is an illustration showing ball placement positions for treatment of the hamstring muscles with the massage device of the present invention.

As shown in FIG. 25A, an embodiment of the present invention provides trigger point therapy of the thigh area between the knee and the hip on the font side of the body.

Figure 25B:
FIG. 25B is an illustration of a seated L-position for treatment of the hamstrings.

As shown in FIG. 25B, lay on your front side of your body on the floor. Bend the leg on the side to be worked and try to grab that ankle. Expand the shaft to the estimated desired length. Roll your body up sideways enough to place the ball under your thigh in the desired location. Roll your body down onto the ball. You can control the amount of pressure by moving leg up and down on the ball. You may need to lengthen or shorten the shaft to a comfortable length. Being able to reach the handle with a straight relaxed arm is best, whereby you can easily hold the handle end. 1. Once the ball is in place pivot your leg back and forth so that the ball is rolling on the muscle. 2. When you are finished on one spot, lift your legs off the ball and place the ball in a new location. Place your leg down onto the ball in its new location. Repeat step 1. Repeat the steps on all the muscles of your quadricep. The quadricep consist of four long muscles.

Example 7—Hamstring Therapy

Figure 26A:
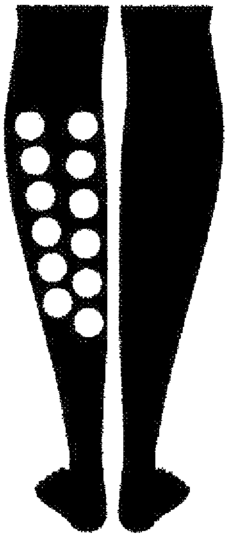
FIG. 26A is an illustration showing ball placement positions for treatment of the calf muscles with the massage device of the present invention.

As shown in FIG. 26A, an embodiment of the present invention provides trigger point therapy between the knee and butt on the back of the legs.

Figure 26B:
FIG. 26B is an illustration of a chair-seated body position for treatment of the calf muscles.

First therapy regimen: as shown in FIG. 26B, sit up in an "L" position on the floor while having one leg straight out in front of you, using one or both arms slightly behind you for support. Slightly lift your leg and place the ball under the leg to be worked on. Most likely you will not have to expand the shaft. You can control the amount of pressure on the ball by leaning your body forward and/or pointing your toes. 1. Once the ball is in place rotate your left and right. You should feel the result of this action on you hamstrings. Lean forward to increase the pressure on the muscles if desired. 2. When you are finished, lift your leg, and place the ball in a new location and repeat step 1.

Second therapy regimen: Sit normally on a chair with no cushion on it. Slightly lift your leg and place the ball under the leg to be worked on. Most likely you will not have to expand the shaft. You can control the amount of pressure on the ball by leaning your body forward and/or straightening that leg. 1. Once the ball is in place straighten your leg and rotate your left and right. You should feel the result of this action on you hamstrings. Lean forward to increase the pressure on the muscles if desired. 2. Bend leg and lean forward to increase the pressure on the ball. Slowly swing the leg left and right like a pendulum. 3. When you are finished, lift your leg, and place the ball in a new location and repeat step 1 and 2. NOTE: Be careful when placing the ball on a nerve. You should only feel pressure not any radiating pain.

Example 8—Calf Therapy

Figure 27A:
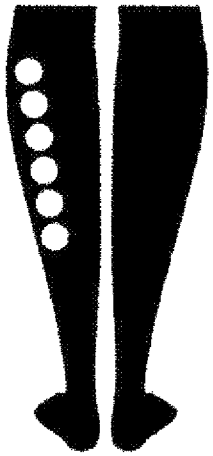
FIG. 27A is an illustration showing ball placement positions for treatment of the shin with the massage device of the present invention.

As shown in FIG. 27A, an embodiment of the present invention provides trigger point therapy between the ankle and knee on the back of the leg.

Figure 27B:
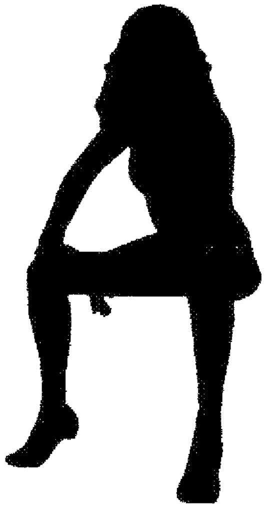
FIG. 27B is an illustration a chair-seated body position for treatment of the shin.

As shown in FIG. 27B, sit in a chair or on the floor. Bend the leg on the side to be worked place the ankle on the opposite knee. Contract the shaft to the smallest length. Grab the end of the shaft closet to the ball with your pinky side of your hand resting on the ball. You can control the amount of pressure by pushing harder into the muscle. 1. Press the ball into the calf and slowly rotate the handle in a small circular clockwise direction while keeping the ball in the same spot on the muscle. 2. Press the ball into the calf and slowly rotate the handle in a small circular counterclockwise direction while keeping the ball in the same spot on the muscle. 3. Press the ball into the calf and slowly rock the handle back and forth while keeping the ball in the same spot on the muscle. 4. When you are finished, place the ball in a new location and repeat steps 1 thru 3. Repeat the steps on all the muscles of your calves.

Example 9—Shin Therapy

Figure 28A:
FIG. 28A is an illustration showing ball placement positions for treatment of the foot with the massage device of the present invention.

As shown in FIG. 28A, an embodiment of the present invention provides trigger point therapy between the ankle and knee on the front of the leg.

Figure 28B:
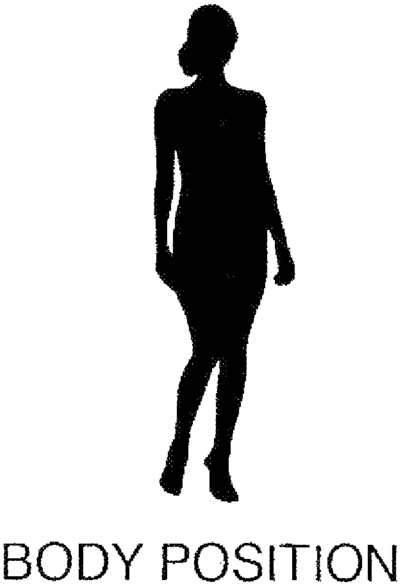
FIG. 28B is an illustration of a standing body position for treatment of the foot.

As shown in FIG. 28B, sit in a chair or on the floor. Bend the leg on the side to be worked place the ankle on the opposite knee. Contract the shaft to the smallest length. Grab the end of the shaft closet to the ball with your pinky side of your hand resting on the ball. You can control the amount of pressure by pushing harder into the muscle. 1. Press the ball into the shin between the muscle and bone then slowly rotate the handle in a small circular clockwise direction while keeping the ball in the same spot on the muscle. 2. Press the ball into the shin between the muscle and bone then slowly rotate the handle in a small circular counterclockwise direction while keeping the ball in the same spot on the muscle. 3. Press the ball into the shin between the muscle and bone then slowly rock the handle back and forth while keeping the ball in the same spot on the muscle. 4. When you are finished, place the ball in a new location and repeat steps 1 thru 3. Repeat the steps on all the muscles of your shins.

Example 10—Foot Therapy

Figure 29A:
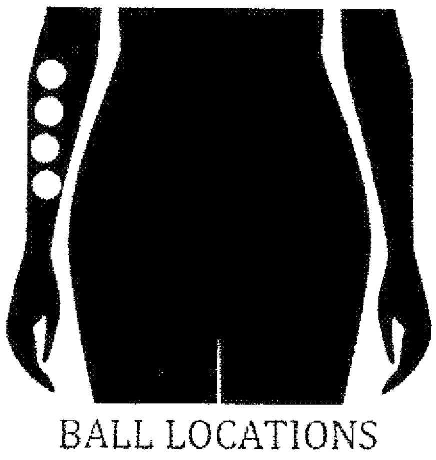
FIG. 29A is an illustration showing ball placement positions for treatment of the forearm with the massage device of the present invention.

As shown in FIG. 29A, an embodiment of the present invention provides trigger point therapy of the bottom of the foot.

Figure 29B:
FIG. 29B is an illustration of chair-seated body positioning for treatment of the forearm.

As shown in FIG. 29B, stand on the floor. Extend the shaft to the full length. Put the ball on the floor while holding the handle in the opposite hand to the side of the foot to massage. Hold the shaft perpendicular to the floor then tilt the shaft to the greatest reachable angle to the floor. Place your foot on the ball avoiding pressing on the shaft. You can control the amount of pressure by moving your body to press the foot onto the ball. 1. Once the ball is in place, slowly rotate the end of the shaft in big circular clockwise direction. 2. Next, slowly rotate the end of the shaft in big circular counterclockwise direction. 3. When you are finished, lift your foot, and place it on the ball in a different location and repeat steps 1 and 2. Repeat the steps on all the muscles of your foot that you can comfortably reach. The difference of half an inch in distance of the ball position can make a big difference and finding muscle tension.

Example 11—Forearm Therapy

Figure 30A:
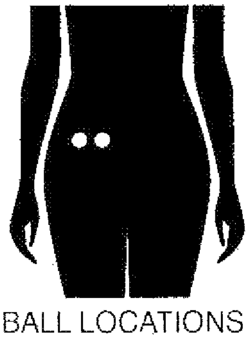
FIG. 30A is an illustration showing ball placement positions for treatment of the iliopsoas with the massage device of the present invention.

As shown in FIG. 30A, an embodiment of the present invention provides trigger point therapy of the arm between the elbow and the wrist.

Figure 30B:
FIG. 30B is an illustration of body positioning for treatment of the iliopsoas.

As shown in FIG. 30B, sit in a chair or on the floor. Rest your arm on your lap or table. Contract the shaft to the smallest length. Grab the end of the shaft closet to the ball with your pinky side of your hand resting on the ball. You can control the amount of pressure by pushing harder into the muscle. 1. Press the ball into the forearm and slowly rotate the handle in a small circular clockwise direction while keeping the ball in the same spot on the muscle. 2. Press the ball into the forearm and slowly rotate the handle in a small circular counterclockwise direction while keeping the ball in the same spot on the muscle. 3. Press the ball into the forearm and slowly rock the handle back and forth, while keeping the ball in the same spot on the muscle. 4. When you are finished, place the ball in a new location and repeat steps 1 thru 3. Repeat the steps on all the muscles of your forearm.

Example 12—Iliopsoas Therapy

As shown in FIG. 31A, an embodiment of the present invention provides trigger point therapy of the area between the hip bone and belly.

As shown in FIG. 31B, lay on your front side of your body on the floor. Use your forearm of the opposite side to support you by bending your arm and placing your forearm on the floor while keeping your back arched. Bend the leg on the side to be worked and try to grab that ankle. Expand the shaft to the estimated desired length. Roll your body up sideways enough to place the ball under your Iliopsoas in the desired location. Roll your body down onto the ball. You can control the amount of pressure by moving or pulling your leg up and down on the ball. You may need to lengthen or shorten the shaft to a comfortable length. Being able to reach the handle with a straight relaxed arm is best, whereby you can easily hold the handle end. 1. Once the ball is in place pivot your leg back and forth so that the ball is rolling on the muscle. 2. When you are finished on one spot, lift your leg off the ball and place the ball in a new location. Place your leg down onto the ball in its new location. Repeat step 1. Repeat the steps on all the muscles of your Iliopsoas.

It is understood that the examples and embodiments described herein are for illustrative purposes only and that various modifications or changes in light thereof will be suggested to persons skilled in the art and are to be included within the spirit and purview of this application. All publications, patents, and patent applications, websites, and databases cited herein are hereby incorporated by reference in their entireties for all purposes. Where a conflict exists between the instant application and a reference provided herein, the instant application shall dominate.

What is claimed is:

1. A massage system for self-massage comprising:

(1) an adjustable massage appliance comprising:

an extendable and retractable shaft having a radially outermost tubular portion, a proximal shaft end and a distal shaft end opposite the proximal shaft end, wherein the shaft comprises two or more concentric tubular segments;

a handle connected to the proximal shaft end, wherein the handle comprises a proximal handle end and a distal handle end opposite the proximal handle end, and a first pressure accessory connected to the distal shaft end, wherein the first pressure accessory consists essentially of a first ball having a diameter that is greater than a diameter of the radially outermost tubular portion of the shaft, wherein the first ball has a first diameter in the range from 60 mm to 80 mm, and wherein the handle has an outer diameter that is smaller than the diameter of the ball, wherein the distal shaft end comprises distal end threading, said pressure accessory having a mounting hole, wherein an inner surface of said hole comprises screw threads configured to engage the distal end threading of distal shaft end.

2. The massage system of claim 1, wherein the first ball has an average Shore durometer in the range from 30 to 90.

3. The massage system of claim 1, wherein the outer surface of the first pressure accessory comprises a first region and a second region, wherein the first and second region each independently comprise at least 10% of the outer surface of the first pressure accessory, wherein the first region has a first average Shore durometer, wherein the second region has a second average Shore durometer, and wherein the difference between the first and second average Shore durometers is greater than 10.

4. The massage system of claim 1, wherein the handle is replaceably detachable from the proximal shaft end.

5. The massage system of claim 4, wherein the proximal shaft end comprises proximal end threading configured to engage handle threading connected to the handle.

6. The massage system of claim 4, wherein the first pressure accessory is replaceably detachable to the shaft.

7. The massage system of claim 4, further comprising a second pressure accessory, wherein the proximal shaft end comprises proximal end threading configured to engage threading connected to said second pressure accessory and said second pressure accessory is replaceably detachable from the proximal shaft end.

8. The massage system of claim 1, wherein the distal shaft end extends within the first pressure accessory.

9. The massage system of claim 1, wherein the distal shaft end extends to the center of the first pressure accessory.

10. The massage system of claim 1, wherein the first pressure accessory comprises a material selected from the list consisting of natural rubber, synthetic rubber, silicone, elastomer, polymer, wood, and plastic.

11. The massage system of claim 1, wherein the extendable and retractable shaft is configured to extend to a length of 4 feet, and to retract to a length of 1 foot.

12. The massage system of claim 1, wherein each of the tubular segments independently has a wall thickness in the range from 0.02 inches to 0.2 inches.

13. The massage system of claim 1, wherein the outer surface of the first pressure accessory comprises a plurality of protrusions, wherein the protrusions have a first average Shore durometer, wherein the first pressure accessory has a second average Shore durometer, and wherein the difference between the first and second average Shore durometers is greater than 10.

14. The massage system of claim 1, wherein the extendable and retractable shaft comprises seven or more concentric tubular segments with each concentric tubular segment having a diameter, wherein the diameter of each tubular segment is different from one another, wherein the extendable and retractable shaft in its extended state has a tapered longitudinal axis profile from the proximal shaft end to the distal shaft end.

15. The massage system of claim 1, wherein the tubular segments comprise a material selected from the group consisting of metal, steel, aluminum, plastic, and wood.

16. The massage system of claim 1, wherein the handle comprises a material selected from the list consisting of foam, rubber, silicone, wood, and plastic.

17. The massage system of claim 1, wherein the proximal handle end comprises threading configured to engage the screw threads of the first pressure accessory.

18. The massage system of claim 17, wherein a second pressure accessory is connectable to the proximal handle end threading such that the system comprises two pressure accessories.

19. The massage system of claim 18, wherein the first pressure accessory is a ball having a first diameter, wherein the second pressure accessory is a second ball having a second diameter, and wherein the first diameter is more than 20% different than the second diameter.

20. The massage system of claim 19, wherein the first ball has a first average Shore durometer, wherein the second ball has a second average Shore durometer, and wherein the difference between the first and second average Shore durometers is more than 10.

21. A method of self-administering massage therapy on a body or limb, the method comprising: providing the massage system of claim 1; extending the extendable and retractable shaft to a desired length; positioning the first ball proximate to a muscle targeted for massage therapy while holding the handle; and applying weight of the body or limb into the targeted muscle.

22. The method of claim 21, further comprising:

shifting weight of the body or limb into the targeted muscle by incremental movement of the body or limb against the first ball to vary an amount of pressured placed on the targeted muscle by the first ball.

23. The method of claim 21, further comprising:

adjusting the length of the extendable and retractable shaft to a second desired length;

positioning the first ball proximate to a second muscle targeted for therapy while holding the handle and then releasing the handle; and pressing the second muscle towards the first ball and the surface, thereby applying pressure to the first ball.

24. The method of claim 21, further comprising:

positioning the first ball proximate to a second muscle targeted that is adjacent to the first targeted muscle by holding the handle;

pressing the second muscle towards the first ball and the surface, thereby applying pressure to the first ball; and shifting weight of the body or limb into the second targeted muscle by incremental movement of the body or limb against the first ball to vary an amount of pressured placed on the second targeted muscle by the first ball.

25. The method of claim 24, further comprising:

repeating the positioning, pressing, and shifting steps for a third or subsequent muscle adjacent to the second or subsequent targeted muscle.

* * * * *